(12) United States Patent
Huang et al.

(10) Patent No.: US 6,412,944 B1
(45) Date of Patent: Jul. 2, 2002

(54) EYEGLASSES WITH COUPLING UNITS FOR COUPLING TEMPLES AND LENSES THEREOF

(76) Inventors: Hung-Ming Huang, 1F, No. 18, Alley 36, Lane 233, Sec. 2, Chung-Hua S. Rd., Tainan City (TW); Paul Chen, 2485 Roanoke Ave., San Marino, CA (US) 91108

( * ) Notice: Subject to any disclaimer, the term of this patent is extended or adjusted under 35 U.S.C. 154(b) by 0 days.

(21) Appl. No.: 09/934,381

(22) Filed: Aug. 21, 2001

(51) Int. Cl.[7] .............................. G02C 5/22; G02C 1/02

(52) U.S. Cl. ......................... 351/153; 351/110; 16/228

(58) Field of Search .......................... 351/110, 41, 158, 351/153, 140; 16/228

(56) References Cited

U.S. PATENT DOCUMENTS 6,024,445 A * 2/2000 Conner et al. .............. 351/110
6,050,685 A * 4/2000 Lin ............................ 351/110

* cited by examiner

*Primary Examiner*—Hung Xuan Dang
(74) *Attorney, Agent, or Firm*—Ladas & Parry

(57) ABSTRACT

An eyeglasses includes a pair of lenses, a bridging member, a pair of temples with hook ends that have pivotal end sections, and a pair of coupling units interconnecting the lenses and the temples. Each of the coupling units is in the form of a bent wire, and has a coil-shaped end defining a chamber and a bend portion extending from the coil-shaped end. The pivotal end sections of the hook ends of the temples are received in the pivotal chambers in the coil-shaped ends of the coupling units so as to be turnable relative to the coil-shaped ends between extended and retracted positions.

6 Claims, 5 Drawing Sheets

EYEGLASSES WITH COUPLING UNITS FOR COUPLING TEMPLES AND LENSES THEREOF

BACKGROUND OF THE INVENTION

1. Field of the Invention

This invention relates to an eyeglasses with a pair of coupling units for coupling temples to lenses thereof.

2. Description of the Related Art

Conventional eyeglasses normally include a frame on which lenses are mounted, and which is provided with end pieces so as to connect the frame to temples of the eyeglasses via screw means. The conventional eyeglasses are disadvantageous in that the screw means tends to become loose and be damaged after a period of use, and that fixing of the loosened or damaged screw means is troublesome.

SUMMARY OF THE INVENTION

Therefore, it is an object of the present invention is to provide an eyeglasses that is capable of overcoming the aforementioned drawback.

According to the present invention, an eyeglasses comprises: a pair of lenses; a bridging member bridging the lenses; a pair of temples, each of which has a hook end with an upwardly extending pivotal end section and an S-shaped section that extends rearwardly from the pivotal end section to define a first groove with a first groove face facing upwardly, and a second groove with a second groove face facing downwardly; and a pair of coupling units interconnecting the lenses and the temples. Each of the coupling units is in the form of a bent wire, and has a clamping end connected to a respective one of the lenses, a coil-shaped end that has top and bottom ends and that defines a vertically extending pivotal chamber between the top and bottom ends, and a bend portion that extends reardwardly from the top end of the coil-shaped end and that then turns downwardly and frontwardly to define a generally U-shaped section and to connect with the clamping end. The U-shaped section has upper and lower arms. Each of the temples is disposed between the upper and lower arms of the U-shaped section of the bend portion of a respective one of the coupling units with the pivotal end section received in the pivotal chamber in the coil-shaped end of the respective one of the coupling units so as to be turnable relative to the coil-shaped end between an extended position and a retracted position. Each of the temples intersects the lower arm of the respective coupling unit in a manner that the first and second groove faces of the S-shaped section are respectively in contact with the bottom end of the coil-shaped end and the lower arm so as to retain the pivotal end section in the pivotal chamber when the temples are positioned at the extended position. Each of the temples is disposed at an inner side of the U-shaped section of the respective one of the coupling units so as to be limited by the U-shaped section within a turning space defined by the temples and the lenses.

BRIEF DESCRIPTION OF THE DRAWINGS

In drawings which illustrate an embodiment of the invention.

DETAILED DESCRIPTION OF THE PREFERRED EMBODIMENT

Figure 1:
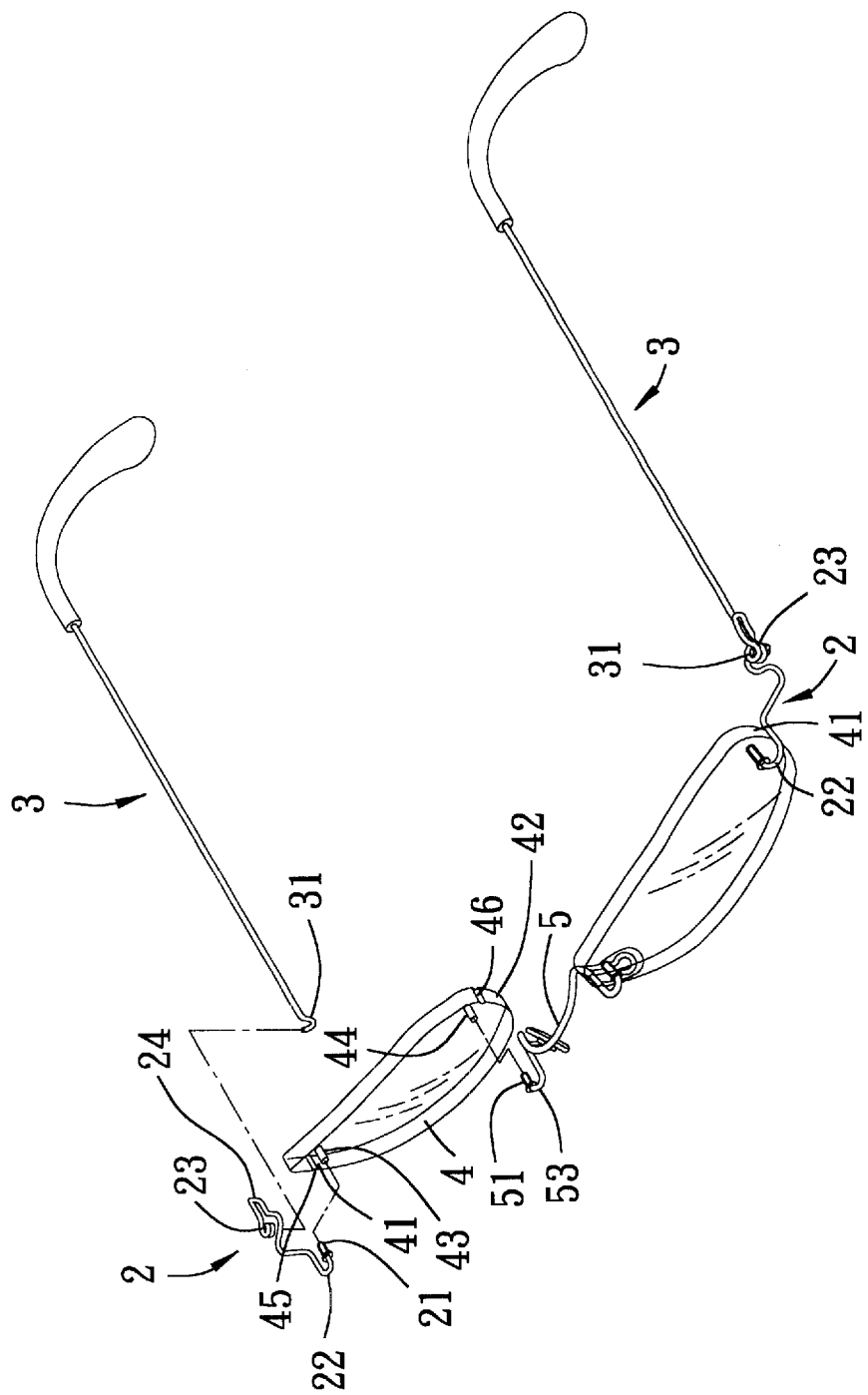
FIG. 1 is a partly exploded perspective view of an eyeglasses embodying this invention.
Figure 2:
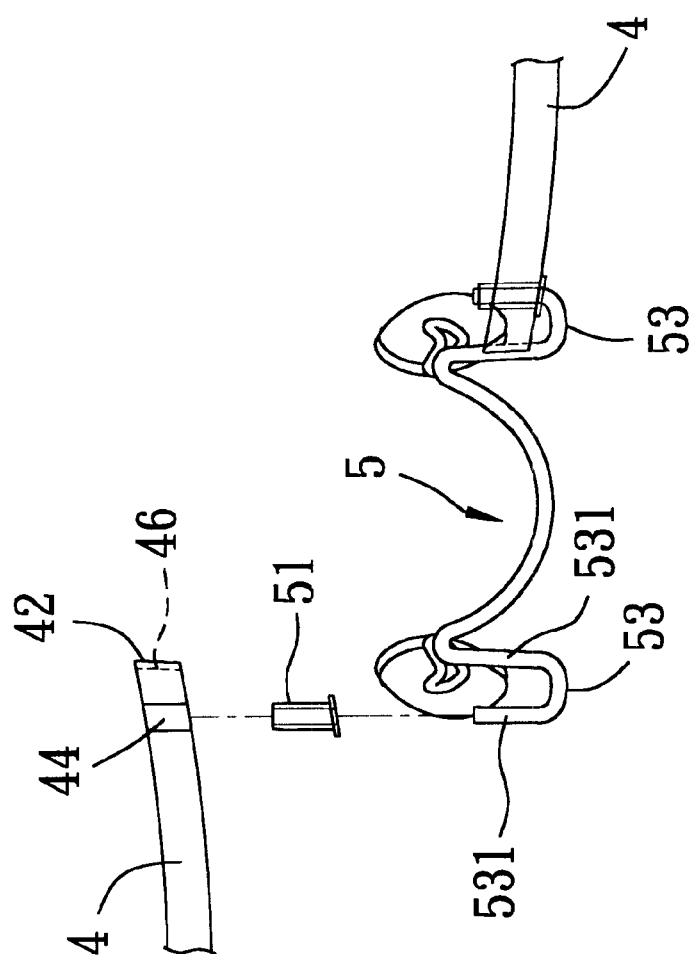
FIG. 2 is a partly fragmentary perspective view to illustrate a connection between a bridging member and lenses of the eyeglasses of FIG. 1.
Figure 3:
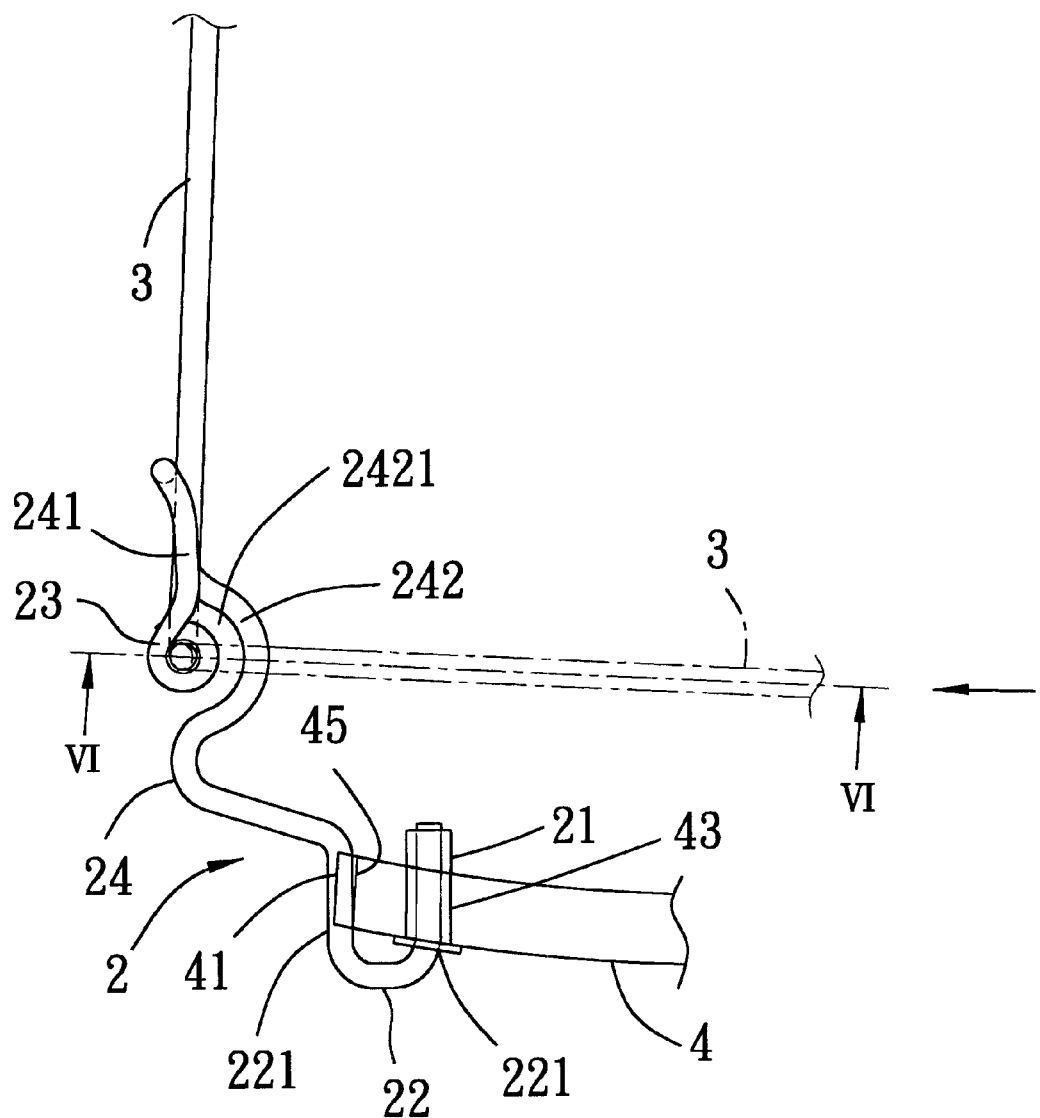
FIG. 3 is a partly fragmentary top view to illustrate a connection between a temple and one of lenses via a coupling unit of the eyeglasses of FIG. 1.
Figure 4:
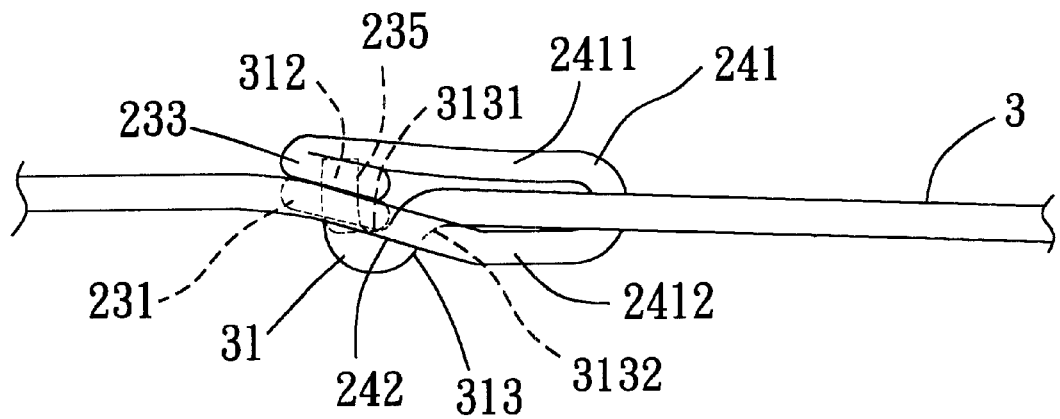
FIG. 4 is a partly fragmentary side view to illustrate a connection between the temple and the coupling unit of the eyeglasses of FIG. 1, with the temple in an extended position.

FIGS. 1 to 4 illustrate an eyeglasses embodying this invention. The eyeglasses includes: a pair of lenses 4; a bridging member 5 bridging the lenses 4; a pair of temples 3, each of which has a hook end 31 with an upwardly extending pivotal end section 312 and an S-shaped section 313 that extends rearwardly from the pivotal end section 312 to define a first groove with a first groove face 3131 facing upwardly, and a second groove with a second groove face 3132 facing downwardly; and a pair of coupling units 2 interconnecting the lenses 4 and the temples 3. Each of the coupling units 2 is in the form of a bent wire, and has a clamping end 22 connected to a respective one of the lenses 4, a coil-shaped end 23 that has top and bottom ends 233, 231 and that defines a vertically extending pivotal chamber 235 between the top and bottom ends 233, 231, and a bend portion 24 that extends rearwardly from the top end 233 of the coil-shaped end 23 and that then turns downwardly and frontwardly to define a generally U-shaped section 241 and to connect with the clamping end 22. The U-shaped section 241 has upper and lower arms 2411, 2412. Each of the temples 3 is disposed between the upper and lower arms 2411, 2412 of the U-shaped section 241 of the bend portion 24 of a respective one of the coupling units 2 with the pivotal end section 312 received in the pivotal chamber 235 in the coil-shaped end 23 of the respective one of the coupling units 2 so as to be turnable relative to the coil-shaped end 23 between an extended position (see FIGS. 3 and 4) and a retracted position (see FIGS. 3 and 5). Each of the temples 3 intersects the lower arm 2412 of the respective coupling unit 2 in a manner that the first and second groove faces 3131, 3132 of the S-shaped section 313 are respectively in contact with the bottom end 231 of the coil-shaped end 23 and the lower arm 2412 so as to retain the pivotal end section 312 in the pivotal chamber 235 when the temples 3 are positioned at the extended position. Each of the temples 3 is disposed at an inner side of the U-shaped section 241 of the respective one of the coupling units 2 so as to be limited by the U-shaped section 241 within a turning space defined by the temples 3 and the lenses 2.

Figure 5:
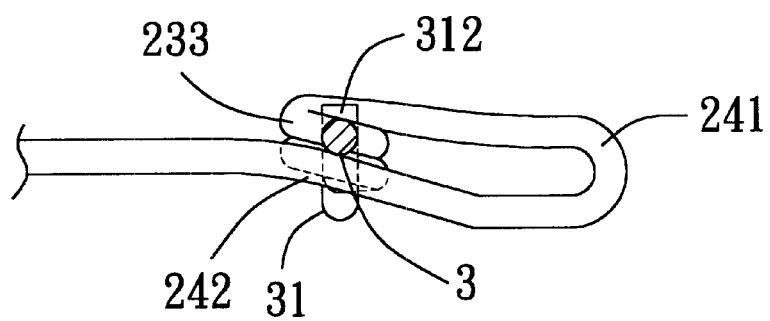
FIG. 5 is a partly fragmentary front view to illustrate a connection between the temple and the coupling unit of the eyeglasses of FIG. 1, with the temple in a retracted position.
Figure 6:
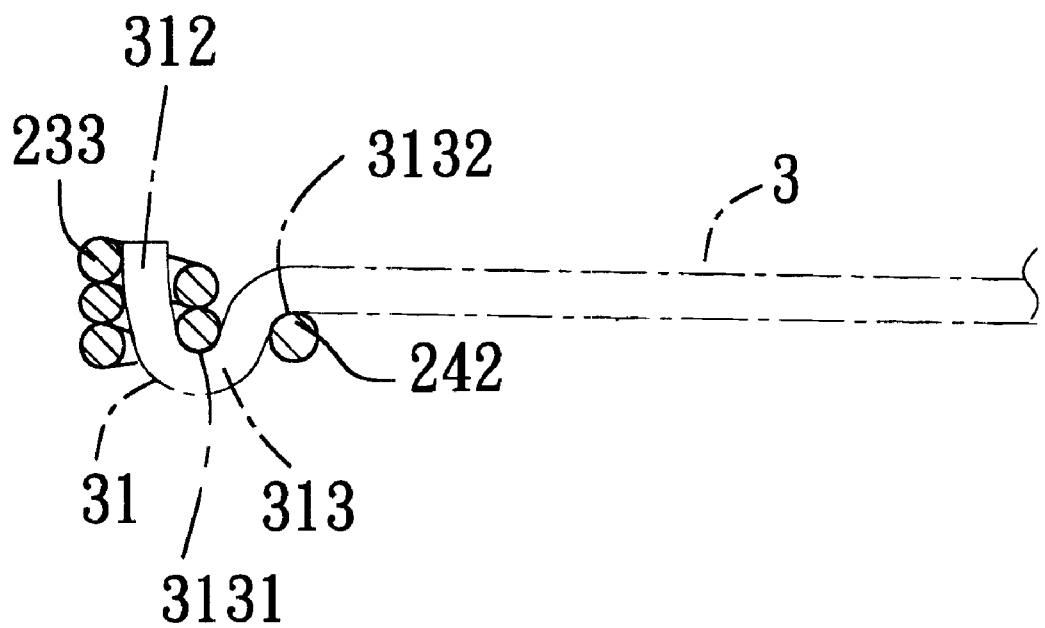
FIG. 6 is a partly sectional view taken along line VI—VI in FIG. 3.

The bend portion 24 of each of the coupling units 2 further has a curved restricting section 242 that extends frontwardly and curvedly from the lower arm 2412 to connect with the clamping end 22, and that surrounds and cooperates with the bottom end 231 of the coil-shaped end 23 to define a passageway 2421 therebetween for passage of the respective one of the temples 3 when moving between the extended position to the retracted position. The first and second groove faces 3131, 3132 of each of the temples 3 are respectively in sliding contact with the bottom end 321 of the coil-shaped end 23 and the restricting section 242 (see FIGS. 3, 5 and 6) when moving from the extended position to the retracted position. Preferably, the coil-shaped end 23 is inclined upwardly relative to the lower arm 2412, and the curved restricting section 242 is inclined upwardly relative to the lower arm 2412 and sidewisely toward the bottom end 231 of the coil-shaped end 23 in a manner that the passageway 2421 is gradually reduced from the extended position to the retracted position, thereby permitting the hook end 31 of each of the temples 3 to be tightly clamped between the curved restricting section 242 and the bottom end 231 of the coil-shaped end 23 when the temple 3 is disposed at the retracted position. As best illustrated in FIG. 5, the curved restricting section 242 is pressed and is displaced downwardly a small distance when the temple 3 is moved to the retracted position, thereby providing a clamping force to clamp tightly the temple 3 between the curved restricting section 242 and the bottom end 231 of the coil-shaped end 23.

Each of the lenses 4 has an outer side face 41 formed with an outer retaining groove 45, and an outer retaining hole 43 adjacent to the outer retaining groove 45. The clamping end 22 of each of the coupling units 2 is U-shaped, and has two opposite clamp arms 221 which are respectively and tightly received in the outer retaining groove 45 and the outer retaining hole 43 of the respective one of the lenses 4 so as to clamp the respective one of the lenses 4. A sleeve 21 is sleeved on the clamp arm 221 in the outer retaining hole 43.

Each of the lenses 4 further has an inner side face 42 formed with an inner retaining groove 46, and an inner retaining hole 44 adjacent to the inner retaining groove 46. The bridging member 5 has a pair of clamping ends 53, each of which is U-shaped, and has two opposite clamp arms 531 that are respectively and tightly received in the inner retaining groove 46 and the inner retaining hole 44 of a respective one of the lenses 4 so as to clamp the respective one of the lenses 4.

With the design of the coupling units 2 and the hook ends 31 of the temples 3, the aforesaid drawback as encountered in the prior art can be eliminated.

With the invention thus explained, it is apparent that various modifications and variations can be made without departing from the spirit of the present invention. It is therefore intended that the invention be limited only as recited in the appended claims.

We claim:

1. An eyeglasses comprising:
   a pair of lenses;
   a bridging member bridging said lenses;
   a pair of temples, each of which has a hook end with an upwardly extending pivotal end section and an S-shaped section that extends rearwardly from said pivotal end section to define a first groove with a first groove face facing upwardly, and a second groove with a second groove face facing downwardly; and
   a pair of coupling units interconnecting said lenses and said temples, each of said coupling units being in the form of a bent wire, and having a clamping end connected to a respective one of said lenses, a coil-shaped end that has top and bottom ends and that defines a vertically extending pivotal chamber between said top and bottom ends, and a bend portion that extends rearwardly from said top end of said coil-shaped end and that then turns downwardly and frontwardly to define a generally U-shaped section and to connect with said clamping end, said U-shaped section having upper and lower arms, each of said temples being disposed between said upper and lower arms of said U-shaped section of said bend portion of a respective one of said coupling units with said pivotal end section received in said pivotal chamber in said coil-shaped end of the respective one of said coupling units so as to be turnable relative to said coil-shaped end between an extended position and a retracted position, each of said temples intersecting said lower arm of the respective one of said coupling units in a manner that said first and second groove faces of said S-shaped section are respectively in contact with said bottom end of said coil-shaped end and said lower arm so as to retain said pivotal end section in said pivotal chamber when said temples are positioned at said extended position, each of said temples being disposed at an inner side of said U-shaped section of the respective one of said coupling units so as to be limited by said U-shaped section within a turning space defined by said temples and said lenses.

2. The eyeglasses of claim 1, wherein said bend portion of each of said coupling units further has a curved restricting section that extends frontwardly and curvedly from said lower arm to connect with said clamping end, and that surrounds and cooperates with said bottom end of said coil-shaped end to define a passageway therebetween for passage of the respective one of said temples when moving between said extended position and said retracted position, said first and second groove faces of each of said temples being respectively in sliding contact with said bottom end of said coil-shaped end and said restricting section when moving from said extended position to said retracted position.

3. The eyeglasses of claim 2, wherein said passageway is gradually reduced from said extended position to said retracted position, thereby permitting said hook end of each of said temples to be tightly clamped between said curved restricting section and said bottom end of said coil-shaped end when said temple is disposed at said retracted position.

4. The eyeglasses of claim 3, wherein said coil-shaped end is inclined upwardly relative to said lower arm, said curved restricting section being inclined upwardly relative to said lower arm and sidewisely toward said bottom end of said coil-shaped end in a manner that said passageway is gradually reduced from said extended position to said retracted position, thereby permitting said hook end of each of said temples to be tightly clamped between said curved restricting section and said bottom end of said coil-shaped end when said temple is disposed at said retracted position.

5. The eyeglasses of claim 1, wherein each of said lenses has an outer side face formed with an outer retaining groove, and an outer retaining hole adjacent to said outer retaining groove, said clamping end of each of said coupling units being U-shaped, and having two opposite clamp arms which are respectively and tightly received in said outer retaining groove and said outer retaining hole of the respective one of said lenses so as to clamp the respective one of said lenses.

6. The eyeglasses of claim 1, wherein each of said lenses has an inner side face formed with an inner retaining groove, and an inner retaining hole adjacent to said inner retaining groove, said bridging member having a pair of clamping ends, each of which is U-shaped, and has two opposite clamp arms that are respectively and tightly received in said inner retaining groove and said inner retaining hole of a respective one of said lenses so as to clamp the respective one of said lenses.

* * * * *